United States Patent [19]

Buja

[11] Patent Number: 4,904,172

[45] Date of Patent: * Feb. 27, 1990

[54] APPARATUS FOR DATA ACQUISITION AND APPLICATION IN AN INJECTION MOLDING PROCESS

[75] Inventor: Frederick J. Buja, Rochester, N.Y.

[73] Assignee: Eastman Kodak Company, Rochester, N.Y.

[*] Notice: The portion of the term of this patent subsequent to Aug. 30, 2005 has been disclaimed.

[21] Appl. No.: 208,930

[22] Filed: Jun. 20, 1988

[51] Int. Cl.$^4$ .................... B29C 45/77; B29C 45/80

[52] U.S. Cl. .................... 425/140; 264/40.4; 264/40.5; 425/145; 425/149; 425/150

[58] Field of Search ............... 425/140, 145, 149, 150; 264/40.4, 40.5

[56] References Cited

U.S. PATENT DOCUMENTS

| | | | |
|---|---|---|---|
| 2,433,132 | 12/1947 | Lester | 425/149 |
| 2,671,247 | 3/1954 | Lester | 425/149 |
| 3,859,400 | 1/1975 | Ma | 264/40.7 |
| 3,940,465 | 2/1976 | Hauser et al. | 425/167 |
| 3,976,415 | 8/1976 | Hauser et al. | 425/145 |
| 4,131,596 | 12/1978 | Allen | 425/150 |
| 4,135,873 | 1/1979 | Sone et al. | 425/145 |
| 4,413,967 | 11/1983 | Burry | 425/149 |
| 4,767,300 | 8/1988 | Buja et al. | 425/140 |

FOREIGN PATENT DOCUMENTS 2527976 12/1983 France .
11974 4/1978 Japan .

OTHER PUBLICATIONS

Bernard Sanschagrin, "Process Control of Injection Molding", Polymer Engineering and Science, Mid–Jun. 1983, vol. 23, No. 8, pp. 431–437.

*Primary Examiner*—Jay H. Woo
*Assistant Examiner*—Timothy W. Heitbrink
*Attorney, Agent, or Firm*—Robert L. Randall

[57] ABSTRACT

An injection molding apparatus utilizing an injection molding machine having a pair of separable mold elements forming a mold cavity therebetween and arranged for separation for the removal of the molded product, means for opening and closing the mold elements, and injection means for injecting the moldable material into the mold cavity at a first pressure and for exerting a second pressure on the moldable material as it cures in the cavity. The apparatus provides data acquisition and application in the operation of the injection machine. The apparatus includes means for measuring the separation of the mold elements during the injection of the moldable material, and means for causing the injection pressure from the first pressure to the second pressure upon detecting a predetermined separation known to produce an acceptable product. Means is provided for maintaining the second pressure until the thermoplastic material has cured. The mold is then opened and the cured product is ejected. Means is provided for detecting and accumulating the maximum separation of the mold elements during a plurality of mold cycles while producing acceptable product. Then, a value for the separation of the mold elements is selected based on the maximum measurements accumulated, and means is provided for substituting the new value for use during subsequent cycles to improve product quality for the predetermined separation previously used.

5 Claims, 6 Drawing Sheets

APPARATUS FOR DATA ACQUISITION AND APPLICATION IN AN INJECTION MOLDING PROCESS

RELATED APPLICATIONS

The present application is related to my co-pending applications Ser. Nos. 115,675 and 115,676, both filed on Nov. 2, 1987, and now U.S. Pat. Nos. 4,767,300 and 4,767,579, respectively, and to my co-pending applications entitled METHOD OF CONTROLLING AN INJECTION MOLDING PROCESS, Ser. No. 208,903, APPARATUS FOR CONTROLLING AN INJECTION MOLDING PROCESS, Ser. No. 209,140, METHOD OF IMPROVING THE CYCLE TIME OF AN INJECTION MOLDING PROCESS, Ser. No. 209,405, APPARATUS FOR IMPROVING THE CYCLE TIME OF AN INJECTION MOLDING PROCESS, Ser. No. 208,439, METHOD OF GENERATING AN ACCEPTABLE PART AND PROCESS WINDOW FOR AN INJECTION MOLDING PROCESS, Ser. No. 208,908, APPARATUS FOR GENERATING AN ACCEPTABLE PART AND PROCESS WINDOW FOR AN INJECTION MOLDING PROCESS, Ser. No. 208,909, METHOD OF OPERATING AN INJECTION MOLDING PROCESS UTILIZING AN ACCEPTABLE PART AND PROCESS WINDOW, Ser. No. 208,928, APPARATUS FOR OPERATING AN INJECTION MOLDING PROCESS UTILIZING AN ACCEPTABLE PART AND PROCESS WINDOW, Ser. No. 208,927, and METHOD OF DATA ACQUISITION AND APPLICATION FOR AN INJECTION MOLDING PROCESS, Ser. No. 208,918, all filed on even date herewith.

BACKGROUND OF THE INVENTION

1. Field of the Invention

The present invention is directed to a apparatus for data acquisition and application in an injection molding process whereby the process and resulting product may be closely controlled.

2. Description of the Prior Art

The production of consistent and uniform product by the injection molding process has been a long standing objective of the injection molding industry. This objective has become more difficult to achieve as more and more products are produced by this process which are ever increasingly complex and have ever tighter tolerances. The objective has been further complicated by the trend towards fewer and fewer operators associated with the injection molding machines, requiring greater automatic control of the process and apparatus.

A variety of interrelated parameters of the material, machine, and mold must be accommodated by any automated control system for the satisfactory operation of an injection molding apparatus; among these parameters are the type of material being molded, the consistency of the plastic characteristics, the molding cycle time, the machine shot size, melt viscosity and temperature consistency, mold clamp pressure, and injection pressure, among others. It has been found that, as each of these parameters varies during the operation of an injection molding machine, the product uniformity may suffer without constant operator attention. One of the solutions to the control of these many variables has been the use of longer molding cycles to assure that the effect of these variations are accommodated without adversely affecting the final product. As a result, the productivity of the machines have been reduced from that otherwise possible in order to obtain consistently satisfactory parts.

Many attempts have been made at automatically controlling the injection molding process to produce uniform and consistent product, yet none of the proposed solutions has gained widespread acceptance, at least partially due to the fact that the proposed solutions do not satisfactorily address all of the variables involved. Moreover, few of the prior art controllers even address the issue of cycle time improvement.

Among the solutions proposed are those taught by U.S. Pat. Nos. 2,433,132 and 3,976,415 and French Pat. No. 2,527,976 wherein the separation of the mold elements at the part-line is measured and the result utilized to change the machine from the injection phase to a pulsing of the injection ram to maintain the part-line separation constant during the packing and curing of the mold. This system has not been found to be feasible for the manufacture of small, precision parts since it is nearly impossible to so precisely control the pulsing of the ram to pump the microscopic amounts of material necessary to achieve the desired volumetric accuracy of such parts. This process is also described in the article by Bernard Sanchagrin, entitled "Process Control of Injection Molding" in the mid-Jun., 1983 issue of Polymer Engineering and Science, Vol. 23, No. 8.

Other proposed solutions are exemplified by U.S. Pat. Nos. 2,671,247 and 3,859,400, which teach the control of the switch point of the injection molding machine by sensing the pressure within the mold itself. This system proposes sensing the pressure within the mold to shift the machine from the injection phase to the holding phase while the material cures within the mold. The measurement of the pressure within the mold does not satisfactorily reflect the multiple variables noted above. For example, if the material characteristics are held constant and the machine clamp force is allowed to vary, even if the pressure in the mold cavity remains constant, the part size produced will vary with the clamp force, increasing with reduced clamp force and vice versa. Similarly, with variations in material characteristics, if the viscosity of the material changes, as it may with changes in the injection temperature or with different batches of material, even if the amount of material injected into the mold is substantially constant, the varying viscosity will affect the resistance of the material to being forced into the mold cavity and thus the pressure transmitted into the mold cavity from the injection ram. Accordingly, it will be seen that measuring the pressure in the mold cavity will not truly reflect many of the variables that influence the process and the product.

Another proposed method of controlling injection molding processes is that taught by U.S. Pat. No. 3,940,465 wherein the measurement of the separation of the part-line is utilized to control the cure time of the injection molding cycle. This type of control fails to reflect all of the variables, noted above, which must be accommodated to accurately control part weight and dimension.

U.S. Pat. No. 4,135,873 teaches the measurement of the part-line separation and comparing the separation with a predetermined value and thereafter varying the injection pattern of the injection ram during the following molding cycle. This system does not provide control of the process on a real time basis, reflecting system conditions that are affecting the current cycle. Such a system merely reflects what occurred on the previous cycle, resulting in a tendency for the system to hunt rather than zero into a mode of operation which provides product consistency.

U.S. Pat. No. 4,131,596 teaches the measurement of the part-line separation to reduce the mold clamping pressure upon the measurement of a predetermined separation to minimize any damage to the mold due to flashing of the material at the part-line. This, of course, does not contribute to the control of product weight and dimension.

Japanese Patent Publication No. 11974 of 1978 discloses a method of controlling an injection molding machine wherein the part-line separation is measured and, upon reaching a predetermined reference separation, the machine is switched from a material filling mode to a dwelling mode. The mold separation is then measured and the maximum separation is determined. Thereafter, pressure during the dwell or curing phase of the mold cycle is controlled dependent upon the maximum separation reached to control the final mold separation value at the end of the cure time. Thereafter, the reference separation value for the switch point for the following cycle is changed to accommodate the variations in the machine operation detected during the first cycle. This system of control has the disadvantage that the switch point is determined by the preceeding cycle and thus does not reflect the conditions of the current cycle. This system of control thereafter attempts to adapt to the variations in the molding conditions existing during the current cycle by controlling the holding pressure during the cure phase of the cycle which can adversely affect part weight and density uniformity.

Each of the foregoing control systems has either been too complex and expensive and/or has not provided the requisite control related to all of the variables acting upon an injection molding process.

It has been found that the variables noted above are reflected in the molding process through the part-line opening which also reflects the consistency of the dimensions and weight of the molded product. During repeated molding cycles variations in the product from the molding process can range from under-filled mold cavities (short) to over-filled mold cavities (flashed). The aim point for the process will be somewhere between these two extremes to produce a product which meets the dimensional and weight tolerances established for that process and product. Further, it is known that mechanical and thermal strains are inherent in the molding process which are then transfered to the molded product, sometimes to the detriment of the dimensional stability and life of the product. The mechanical strains are produced by the clamping pressure necessary to hold the mold elements together against the force of the injection of the molten material. The thermal strains occur during the filling and packing of the mold with the high temperature molten material and its effect on the much cooler mold cavity walls, followed by the shrinkage of the material as it cures.

Accordingly, the provision of apparatus for controlling and improving the cycle time of an injection molding process without the requirement of constant operator attention would significantly enhance the productivity and applicability of the process, as well as minimize the strain on the molding apparatus and the residual stress in the molded product.

SUMMARY OF THE INVENTION

Thus, the present invention provides apparatus which provides data acquisition and application in the operation of an injection molding machine having a pair of separable mold elements forming a mold cavity therebetween and arranged for separation for the removal of the molded product, means for opening and closing the mold elements, and injection means for injecting a moldable material into the mold cavity at a first pressure and for exerting a second pressure on the moldable material as it cures in the cavity. The apparatus includes means for measuring the separation of the mold elements during the injection of the moldable material, and means for changing the injection pressure from the first pressure to the second pressure upon detecting a predetermined separation known to produce an acceptable product. Means is provided for maintaining the second pressure until the thermoplastic material has cured. The mold is then opened and the cured product is ejected. Means is provided for detecting and accumulating the maximum separation of the mold elements during a plurality of mold cycles while producing acceptable product. Then, a value for the separation of the mold elements is selected based on the maximum measurements accumulated, and means is provided for substituting the new value for use during subsequent cycles in place of the predetermined separation value previously used.

Further, the present invention provides a method wherein the selected value that is substituted for the predetermined value is set at 30-70% of the greatest maximum separation measurement accumulated.

More particularly, the present invention provides a method wherein the selected value that is substituted for the predetermined value is set at 50% of the greatest maximum separation measurement accumulated.

Various means for practicing the invention and other features and advantages thereof will be apparent from the following detailed description of illustrative preferred embodiments of the invention, reference being made to the accompanying drawings.

BRIEF DESCRIPTION OF THE DRAWINGS

FIGS. 4-1 to 4-4 is a logic chart illustrating the operation of the present invention.

DETAILED DESCRIPTION OF THE PREFERRED EMBODIMENT

Figure 1:
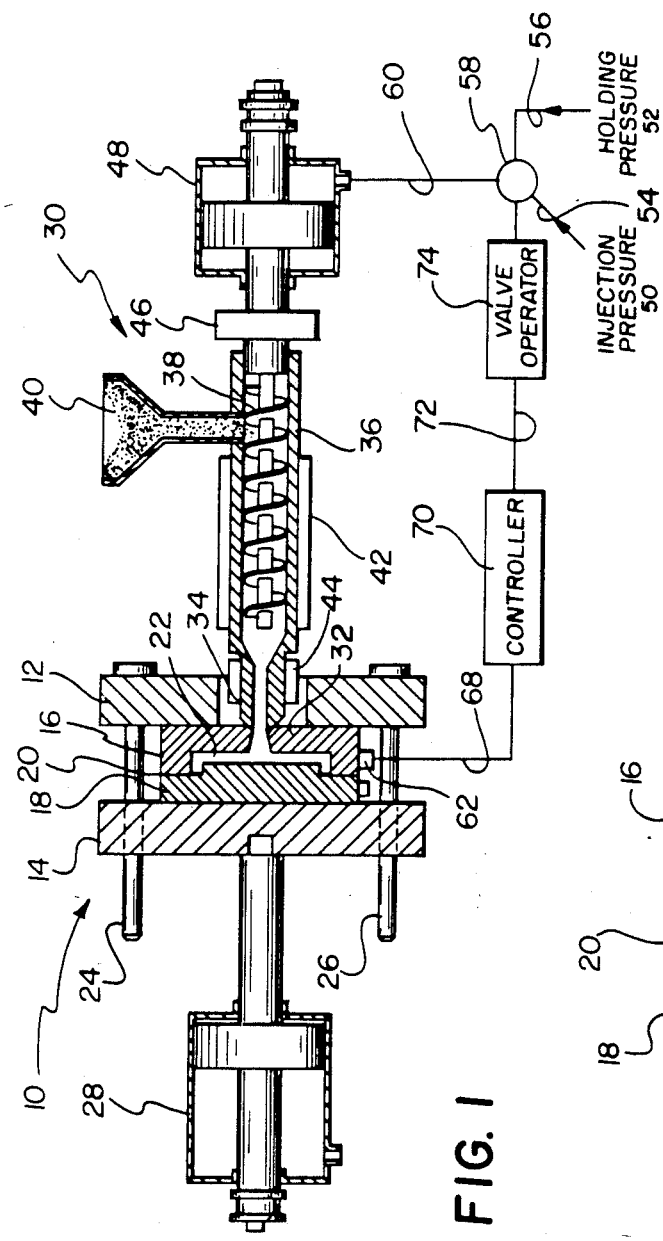
FIG. 1 is an elevation view, partially in section, of an injection molding apparatus adapted for use with the present invention.
Figure 2:
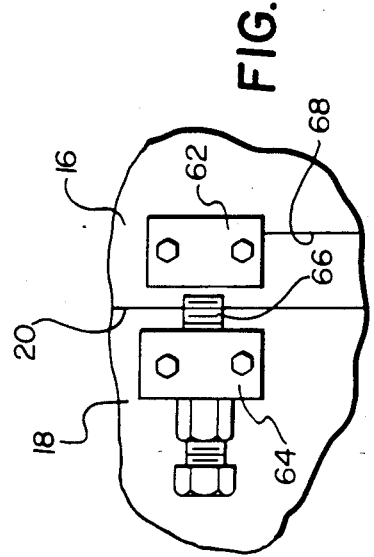
FIG. 2 is an enlarged portion of the part-line between the mold elements showing the mounting of the part-line sensor.

One form of an injection molding apparatus 10 is illustrated in FIG. 1 and comprises a pair of pressure platens 12 and 14 arranged to carry a pair of mold elements 16 and 18, respectively. The mold elements are arranged to meet at a part-line 20 and form a mold cavity 22 therebetween, all in a manner well known in the art. Platen 12 and the mold element 16 associated therewith are stationarily arranged on the machine while platen 14 and mold element 18 associated therewith are movably arranged to be displaced along tie bars 24 and 26 between an open and closed position by a hydraulic cylinder 28.

A plastic extruder assembly 30 is arranged to engage a gate 32 in the mold element 16 with an injection nozzle 34 at the outlet end of the extruder. The main portion of the extruder comprises an extruder barrel 36 having a rotating plasticating screw 38 therein which receives particulate material from a supply 40, and via heat and manipulation plasticates the material for injection through nozzle 34 into the mold cavity 22. To aid in the plastication of the material the extruder barrel is provided with encasing heater elements 42 and 44, in a manner well known in the art. The screw is rotated by a gear 46 driven by a motor, not shown, and is driven longitudinally to inject the molten material into the mold cavity by means of a hydraulic cylinder 48. The hydraulic cylinder 48 is provided with hydraulic fluid from a power source in order to drive the screw longitudinally during the injection process. The hydraulic fluid supply provides both a high pressure for the injection phase of the cycle as well as a low pressure for the holding phase of the cycle, as is well known in the art. One example of such a hydraulic supply comprises two separate sources of hydraulic fluid, one a high, injection pressure 50, and the other a lower, holding pressure 52 connected by lines 54 and 56 to a control valve 58 which determines which pressure is supplied, by line 60, to the hydraulic cylinder 48.

While a reciprocating screw injection molding machine is illustrated for the purposes of describing the present invention, it will be appreciated by those skilled in the art that other forms of injection molding machines such as plunger and transfer-compression molding machines may also be employed.

A distance sensor 62 is mounted on the stationary mold element 16 adjacent part-line 20. A distance sensor target 64 is mounted on the movable mold element 18 in opposition to the sensor 62. The target may comprise an adjustable bolt or pin member 66 which is arranged to provide the target for sensor 62. The sensor and target are arranged to come into close proximity when the mold elements are closed and clamped but are carefully positioned so that at no time do they contact one another. The sensor element 62 may be of any type known in the art including capacitive, inductive, optical, or other type proximity sensor having a substantially linear output over a range from +10 volts to −10 volts representing a distance range of 0.020 inches. The proximity sensor 62 provides an analog output signal via line 68 to a central processing unit, or controller 70, the operation of which will be described herein below. The controller 70 is arranged to provide an output signal via line 72 to actuate a portion of the molding apparatus, such a valve actuator 74, which is connected to valve 58. Thus, when controller 70 receives the appropriate signal from the proximity sensor 62, it provides an output to valve actuator 74 which switches the valve 58 from the high injection pressure 50 to the lower, holding pressure 52 to thereby control the cycle of the injection molding machine in accordance with the present invention.

It has been found that when an injection molding machine is operated with a sensor sufficiently sensitive to accurately measure the part-line separation between the mold elements 16 and 18, that a characteristic time/displacement (separation) curve is generated for that machine. It has also been found that the part-line separation dimension represented by this curve reflects and integrates the multiplicity of variables operating on the molding machine during the current molding cycle. These variables include mold and machine rigidity, clamp pressure variations, friction and inertia in the mold clamping system, the machine shot size, melt viscosity and temperature consistency, the characteristics of the plastic being molded, and the characteristics of the mold and runner system employed.

Figure 3:
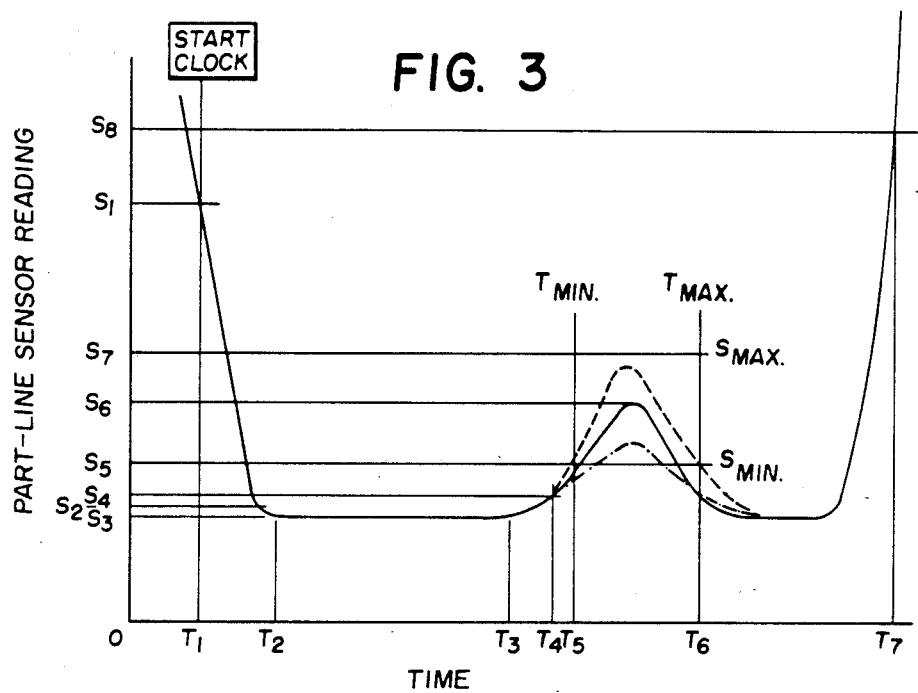
FIG. 3 is a graph illustrating the part-line separation between mold elements during a complete molding cycle.
Figures 1, 4:
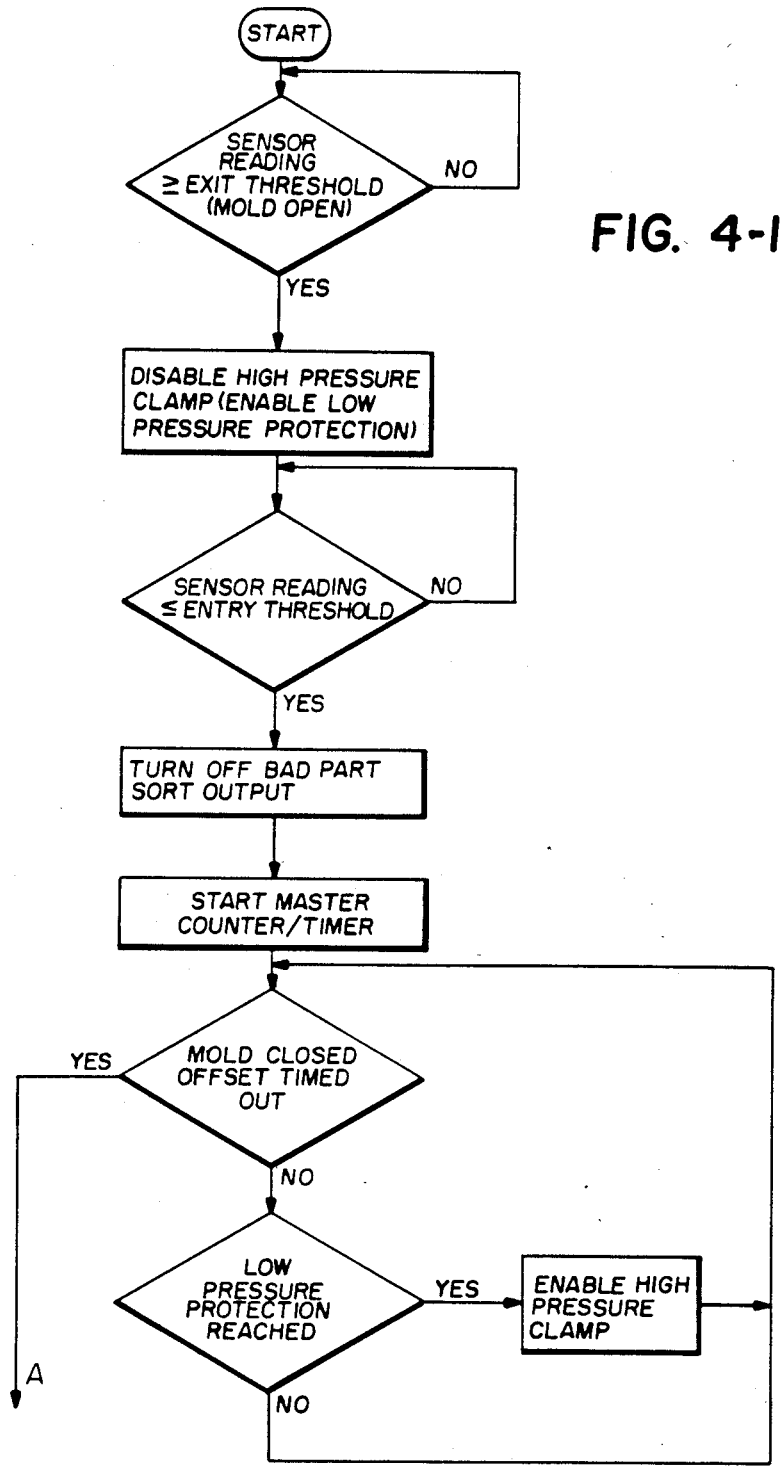
Figures 2, 4:
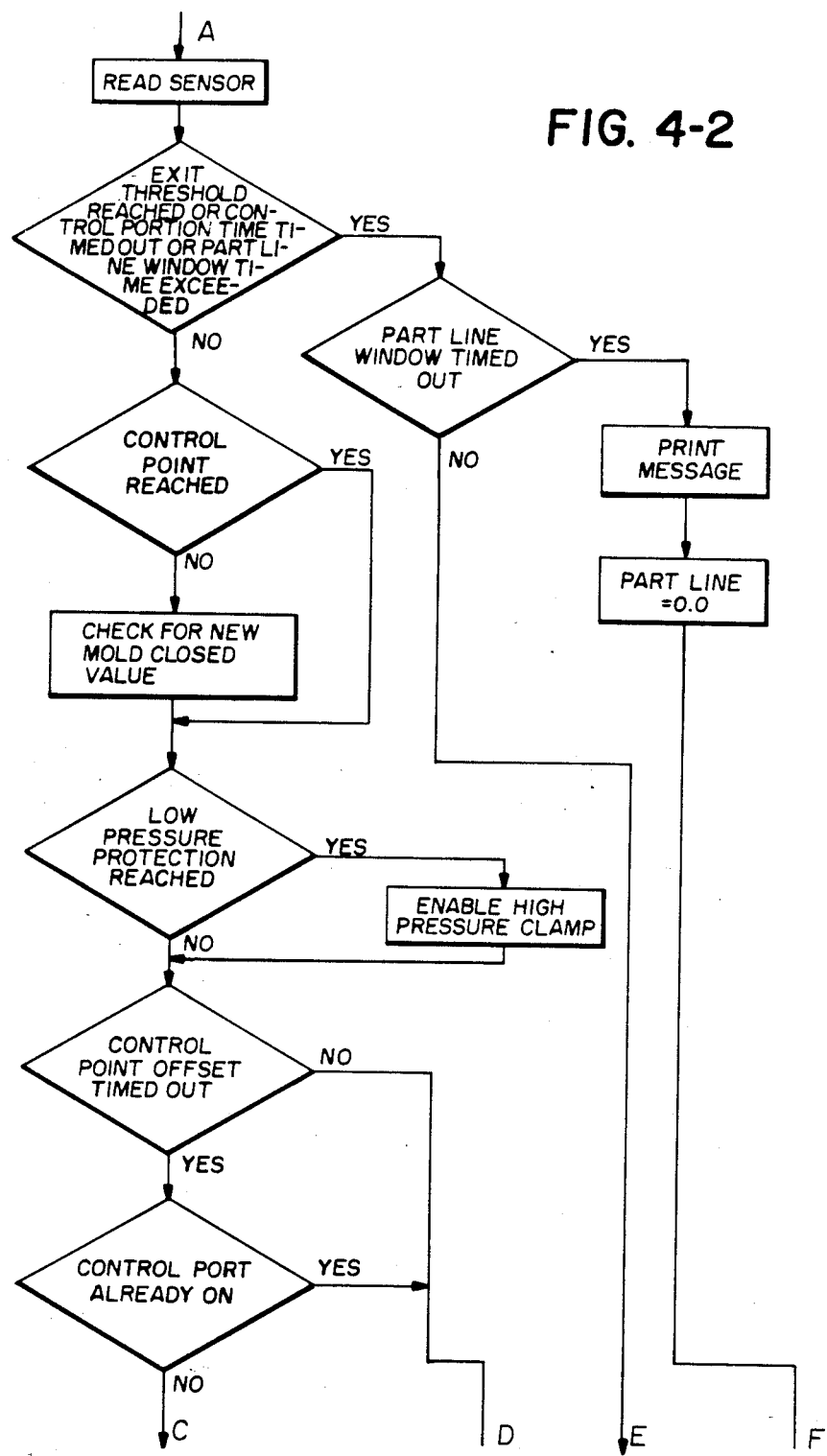
Figures 3, 4:
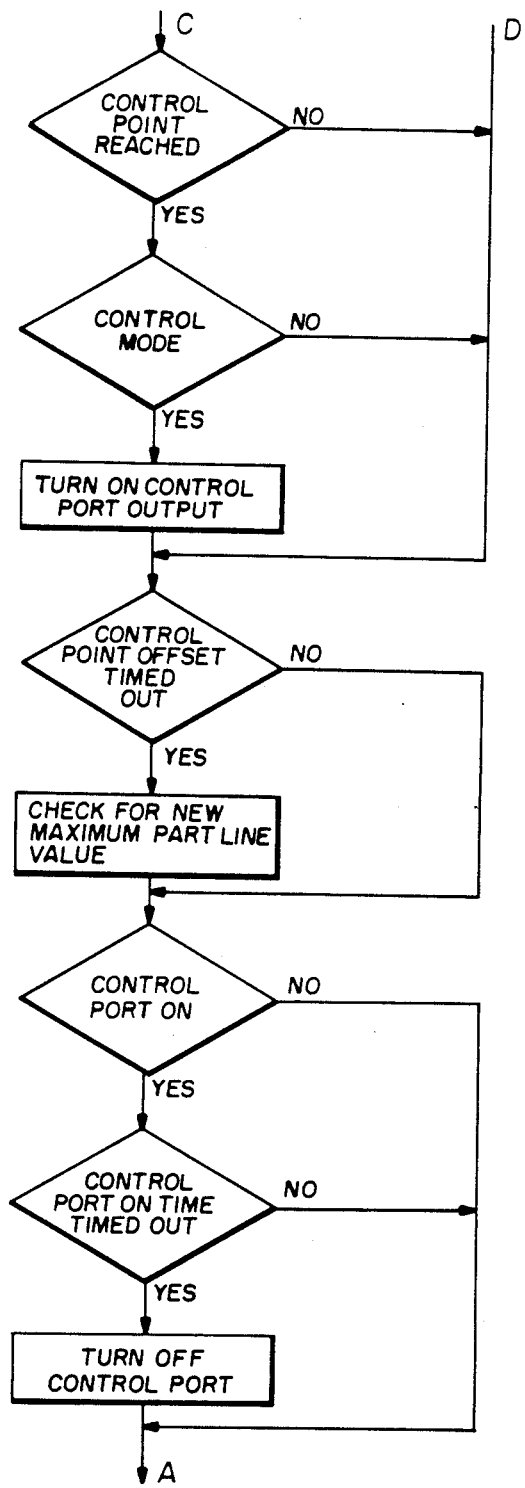
Figure 4:
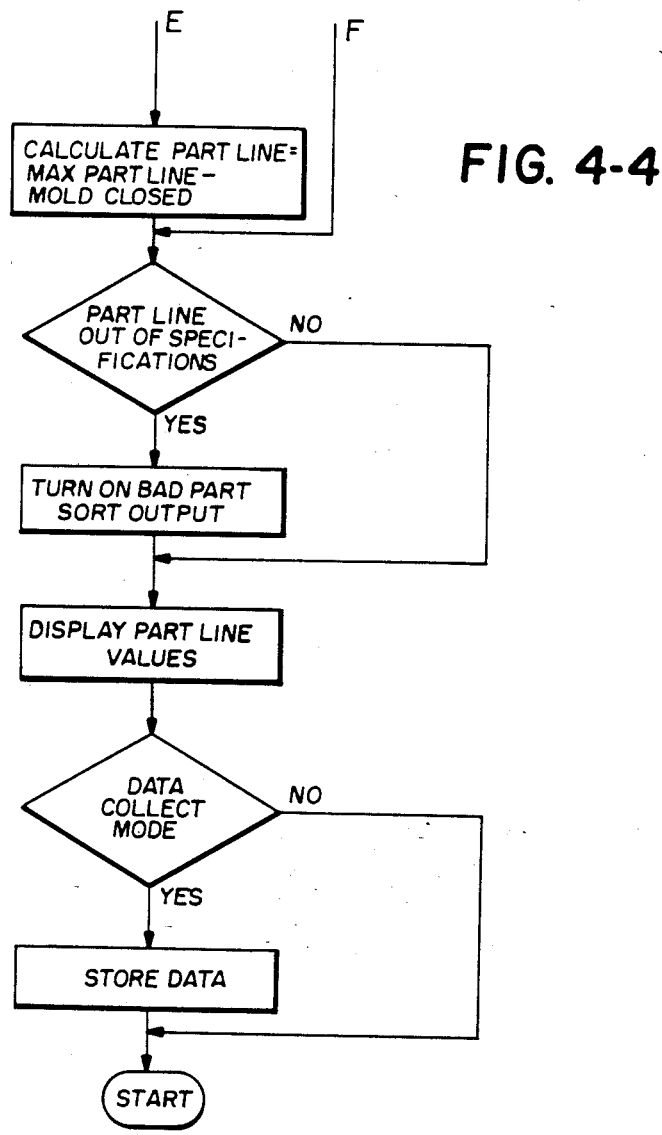

One example of such a time/displacement curve is illustrated in FIG. 3 and will be referred to in the following description of the operation of the present invention in conjunction with the logic chart illustrated in FIGS. 4-1 to 4-4. The curve represents the variation of the part-line separation with respect to time during a single molding cycle of an injection molding machine operating at a steady state condition after stabilization following start-up. As the empty mold elements begin to close, the part-line sensor will start to indicate the part-line separation as the mold elements approach each other. As the mold elements approach a predetermined separation $S_1$, which is designated the Entry Threshold, for example a separation of 0.0095 inches, the high pressure clamp system on the injection molding press is disabled, actuating the low-pressure protection portion of the system. As the Entry Threshold is crossed by the continued closing of the mold elements, the master counter/timer is actuated at $T_1$ and a "bad part sort" output signal is turned off or disabled. As the mold elements continue to close, the part-line separation reaches a "low pressure protection" separation $S_2$ and the machine high-pressure clamp is enabled, permitting the high-pressure clamping of the mold so that the molten plastic material may be injected into the mold cavity. Thereafter, the timer reaches the mold closed offset point $T_2$, and the part-line separation sensor is read to determine the actual measurement of part-line separation sensed after final closing and clamping of the mold elements at $S_3$. The separation value $S_3$, for example 0.005 inches, is then stored in the controller memory for use later in the program. After it is determined that the mold elements have been clamped together, the injection of the molten material into the mold cavity is initiated with the injection ram 30 operating under the high injection pressure 50. As the mold fills during the time from $T_2$ to $T_3$, the part-line separation value remains substantially constant at $S_3$ until the mold has been filled and the injection ram begins to pack out the mold. At this time $T_4$, the mold elements begin to separate along the part-line. When the part-line separation reaches a predetermined control point $S_4$, a control signal is delivered to the valve operator 74, switching valve 58 from the high injection pressure 50 to the lower holding pressure 52.

Thereafter, because of the finite lag in the signal activating the valve 58 and the injection ram responding to the change in pressure, as well as other inertial factors in the machine, the part-line separation will continue to increase until it reaches a maximum $S_6$. At that point the material in the mold will begin to cool and shrink and the part-line separation will fall back to approximately the initial mold closed separation $S_3$ during the curing or cooling phase of the molding cycle. Thereafter, the mold is opened and the part ejected, at which point the sensor will indicate that the part-line separation has exceeded the Exit Threshold $S_8$. When the maximum part-line separation value $S_6$ is detected and measured, the part-line value is calculated by subtracting from the maximum part-line separation $S_6$ the mold closed separation value $S_3$ giving a part-line separation value for each part produced by the mold. Inasmuch as the mold closed separation value is determined for every cycle, variations in the performance of the machine is accommodated by rezeroing the mold closed value for every cycle of the machine.

Examples of other part-line separation curves occurring on the illustrative machine are also illustrated in FIG. 3 as dotted and dash-dot lines. These curves illustrate variations in the part-line that may occur because of variables acting upon the overall system. For example, should some minor change slightly reduce the clamping pressure during a given molding cycle, the maximum part-line separation might increase as illustrated by the dotted line. So long as the increase in part-line separation does not exceed the operator-selected maximum separation $S_7$, then the part produced will still be considered acceptable. Likewise, should the mold clamp force, as an example, be increased during a mold cycle, the final part-line separation would be reduced as illustrated by the dash-dot line. Again, so long as the final part-line separation is above the operator-selected minimum separation $S_5$ the part will be considered acceptable. On the other hand, should the maximum part-line separation achieved fall outside the maximum and minimum part-line separation values selected by the operator, then a "bad part sort" output signal will be generated by the controller which may be utilized by the system or by the operator to identify or remove the out-of-specification part.

The process is initiated after the sensor has been installed in the molding machine and the controller wired to the appropriate controlling portion of the machine. The injection molding machine is then operated by a competent operator to produce acceptable parts. During this operation the controller is set to the "monitor mode" whereby part-line separations are measured and monitored with appropriate data being retained in the controller memory. Appropriate adjustments are made to the process by the machine operator to achieve satisfactory molded parts. As the satisfactory parts are identified, the part-line separation measurements made for those satisfactory parts are utilized to determine the desired predetermined control point as well as the maximum and minimum times within which the maximum part-line separation occurs while still producing satisfactory parts. At the same time, the appropriate time offsets are selected by the operator according to the particular characteristics of that individual machine. As soon as sufficient data has been collected to ensure the operator that the sampling is representative, and the values have been set into the controller, the controller may be switched to the "control mode" wherein it commences the control of the injection molding process.

Figure 3A:
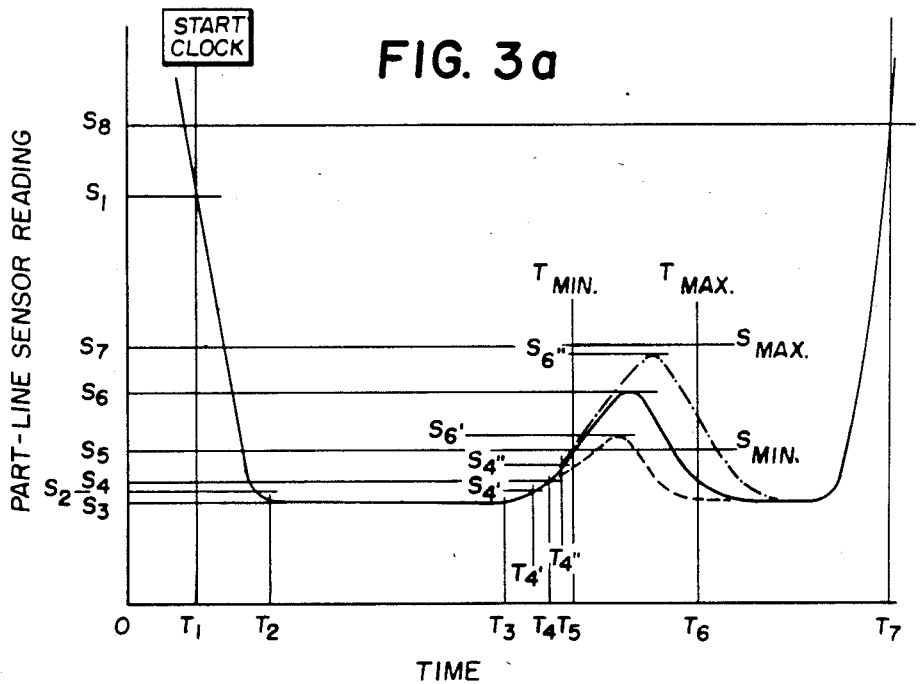
FIG. 3a is a graph similar to that of FIG. 3 showing an effect of varying the control point of the cycle.

Referring now to FIG. 3a wherein a part-line separation graph similar to that of FIG. 3 is illustrated, the effect of varying the selection of the control point on the cycle time is illustrated. For example, should a lower control point $S_4'$ be selected, occurring at an earlier time $T_4'$, the resulting part-line separation following the control point would be as represented by the dotted line and would result in a lower maximum part-line separation $S_6'$. As illustrated, should such a lower control point be selected, the part produced would still fall within the preselected maximum/minimum and thus fall within the acceptable part quality window with a finite reduction in the cycle time required to reach the maximum part-line separation $S_6'$ and to produce the acceptable part.

As a comparison, if a control point $S_4''$ is selected which is greater than that previously utilized, the resulting part-line separation following the control point would be represented by the dash-dot line and the maximum part-line separation $S_6''$ would be increased. Thus, the operator has the option of increasing or decreasing the average cycle time by adjusting the preselected control point.

The various timing offsets (e.g., $T_2$ and $T_3$ in FIG. 3) provided by the present system permits an operator to select the appropriate timing intervals appropriate to that particular machine. Moreover, the timing offsets also function as blanking signals to limit the reading of the part-line separation sensor to the appropriate period in the cycle. Thus, any vibration or jitter present in the machine that occurs during the blanked portions will not provide spurious part-line separation signals that could adversely affect the overall machine control.

The present invention is particularly directed to a method of acquiring and applying data to the molding process to facilitate the establishment of the process. After the molding machine has been operating stably and has been producing satisfactory parts, the data accumulation is initiated and the maximum separation of the mold elements is detected, measured and accumulated from a plurality of mold cycles. (Ten cycles have proven to provide an adequate sample.) Then, the operator selects a new value for the control point based on the maximum measurements accumulated. It has been found that acceptable maximum part-line separations can be achieved when the control point is set to a value between 30 and 70% of the highest maximum part-line separation measured during the accumulation period. More particularly, it has been found that setting the control point at 50% of the highest maximum part-line separation generally provides optimum performance. The new control point value is the substituted for the control point previously used.

Accordingly, the present invention provides a method for acquiring and applying data for use in controlling an injection machine and process by using the measurement of the separation of the mold elements as a verification of achieving product quality while improving the cycle time. The control and measurement of the part-line separation assures part completion as well as part uniformity and quality. The present invention provides verification that all of the variable parameters in the molding machine and process are combining to achieve the specified part. Moreover, the present method obviates unstable operation that can occur when each cycle variation is reflected in the next cycle. Each cycle is controlled by the system conditions existing during that cycle, yet adaptation to longer range trends is provided to maintain part consistency.

The invention has been described in detail with particular reference to a presently preferred embodiment, but it will be understood that variations and modifications can be effected within the spirit and scope of the invention.

What is claimed is:

1. In an injection molding machine having a pair of separable mold elements forming a mold cavity with a part-line therebetween, means for opening and closing the mold elements, and injection means for injecting a moldable material into said mold cavity at a first pressure causing the mold elements to separate and for exerting a second pressure on said moldable material as it cures in said cavity, the improvement comprising apparatus for data acquisition and application in said injection machine comprising means for measuring the separation of the mold elements during the injection of the moldable material, means for changing the injection pressure from said first pressure to said second pressure upon detecting a predetermined separation known to produce an acceptable product, means for maintaining said second pressure until the thermoplastic material has cured, said separation measuring means arranged to continue the measurement of the separation of the mold elements following the changing of the pressure, means for sensing when the separation of the mold elements stops increasing and registering the cessation as the maximum separation of said mold elements, means for accumulating said maximum separations from a plurality of mold cycles while producing acceptable product, means for then selecting a value for said separation of said mold elements based on the maximum separations accumulated, and means for substituting said selected value of said separation for said predetermined separation for use during subsequent cycles to improve product quality.

2. The apparatus according to claim 1 wherein said maximum separations are accumulated over ten mold cycles.

3. The apparatus according to claim 1 wherein said selected value that is substituted for said predetermined value is substantially equal to 30–70% of the greatest maximum separation accumulated.

4. The apparatus according to claim 1 wherein said selected value that is substituted for said predetermined value is substantially equal to 50% of the greatest maximum separation accumulated.

5. In an injection molding machine having a pair of separable mold elements forming a mold cavity with a part-line therebetween, means for opening and closing the mold elements, and injection means for injecting a moldable material into said mold cavity at a first pressure causing the mold elements to separate and for exerting a second pressure on said moldable material as it cures in said cavity, the improvement comprising apparatus for data acquisition and application in said injection molding machine comprising means for measuring a separation of said mold elements during the closing of the mold elements, means for sensing a predetermined separation of said mold elements during the closing of the mold and initiating a first timing cycle of a predetermined time length in response thereto, means for sensing a termination of relative closing movement between said mold elements and determining whether or not said termination occurs during said first timing cycle, means for reopening said mold elements if said termination does not occur during said first timing cycle and, if said termination occurs during said timing cycle, means for commencing the injection of a moldable material into said mold cavity at said first pressure and initiating a predetermined time window starting a predetermined time after said injection commencement, said measuring means arranged to measure the separation of the mold elements during the injection of the moldable material, means for detecting a predetermined separation of said mold elements and determining whether said separation occurs within said time window, means for changing the injection pressure from said first pressure to said second pressure upon detecting said predetermined separation and for maintaining said second pressure until the thermoplastic material has cured, means for detecting a maximum separation of said mold elements and for determining whether or not said maximum separation is within limits by being greater than a predetermined minimum separation and less than a predetermined maximum separation, means for accumulating said maximum separation measurements that are within said limits from a plurality of mold cycles while producing acceptable parts under the control of an operator, means for selecting a predetermined separation of said mold elements based on the maximum separation measurements accumulated, and means for substituting said selected value of said separation for said predetermined separation for use during subsequent cycles to improve product quality.

\* \* \* \* \*